Oct. 4, 1960 H. EGGERDING 2,955,260

CONSTRUCTION OF ELECTRICAL DEVICES

Filed Jan. 21, 1958 2 Sheets-Sheet 1

Inventor
HENRY EGGERDING
By Percy P. Lantzy
Attorney

Inventor
HENRY EGGERDING
By [signature]
Attorney 2,955,260
Patented Oct. 4, 1960

2,955,260

CONSTRUCTION OF ELECTRICAL DEVICES

Henry Eggerding, Belleville, N.J., assignor to International Telephone and Telegraph Corporation, Nutley, N.J., a corporation of Maryland Filed Jan. 21, 1958, Ser. No. 710,350

4 Claims. (Cl. 330—68)

This invention relates to electrical apparatus and more particularly to a novel construction of electrical devices such as amplifiers, modulators, demodulators, mixers and the like.

The development of navigational and other electronic equipment in recent years has brought into existence complex electronic circuitry comprising many electronic devices. If such equipment is to have a reasonable degree of utility, it must be greatly compressed for installation in mobile craft, such as missiles and jet airplanes, where space is at a premium. In the past, navigational equipment has been designed with subminiature components in order to reduce the over-all size and weight of such equipment. However, it has been found that the use of such subminiature components yielded poor temperature stability due to high dielectric losses found in the capacitors and low values of electrical Q due to the low Q characteristics of the induction coils. Thus, a radically different method of construction is desirable which would reduce the over-all size of the navigational equipment, make the parts easily accessible and yet not decrease the accuracy of performance of such equipment.

An object of this invention therefore is to provide such a unit construction for electrical devices which satisfies the aforementioned needs.

Another object is the provision of an assembly of electrical devices in which a single electrical unit may be readily mechanically segregated and made available for test, repair, or replacement.

Another object is the provision of an improved means for shielding the parts in an electrical device.

In accordance with a feature of the present invention, there is provided an electrical device containing an input circuit, an output circuit, and an electron discharge device connected, for example, in the form of an IF amplifier. The device is enclosed in a casing for shielding purposes. The end walls of the device have openings contained therein to control the degree of mutual coupling between the input tank circuit of one electrical device and the output tank circuit of a similiarly constructed electrical device disposed adjacent thereto. The terminal connections of an electron discharge unit are connected to a ceramic socket member which is located in one wall of the electrical device. A shield is interposed between the terminal connections of the grid and plate connections of the electron discharge unit so as to prevent regenerative coupling between these connections.

Other and further objects and features of the present invention will become apparent with reference to the following description and drawings, in which.

Figure 1:
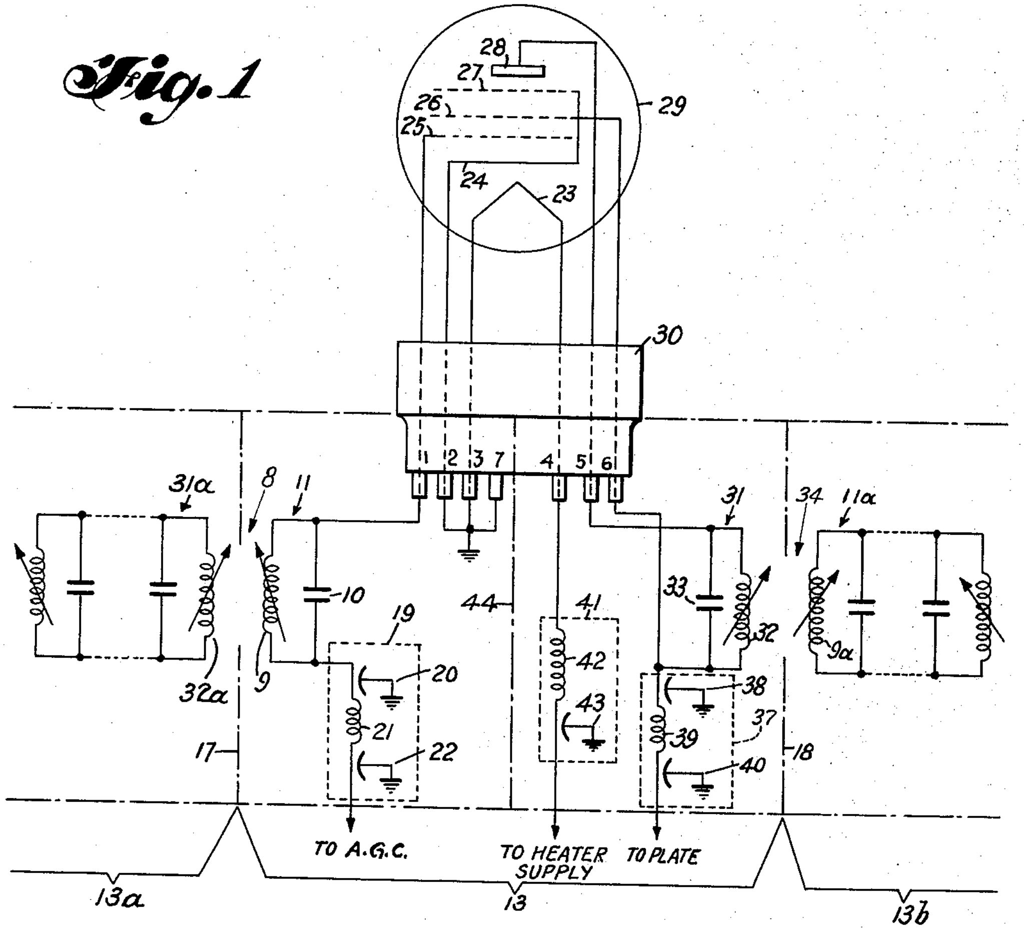
Fig. 1 is a combined electrical schematic and sectional view of an assembly of electrical devices.

Referring to Fig. 1, there is shown an assembly of typical electrical devices 13, **13*a*, and 13*b*. Electrical device 13 is in the form of an IF amplifier. Electrical devices 13*a* and 13*b*** may be regarded as amplifier stages for purposes of simplicity, although they may comprise different units if desired. In addition, as many of these electrical devices may be connected in tandem as are required. It is to be understood that the electrical device is not to be limited to the specific circuit shown here for illustration, but that it may employ many other types of electronic circuits such as detectors, modulators, etc.

The input tank circuit 11 of electrical device 13 is composed of secondary winding 9 of transformer 8 and capacitor 10 in parallel, and is tuned to an assigned intermediate frequency. Transformer 8 has its primary winding **32*a* connected as a part of the output tank circuit 31*a* of adjacent electrical device 13*a*. The output tank circuit of electrical device 13 is similar to the output tank circuit of electrical device 13*a*. Electrical device 13 is encased in a shielded enclosure except for openings present in its end walls 17 and 18. The primary and secondary windings of transformer 8 are inductively coupled through the opening in end wall 17**, the size of this opening controlling the degree of mutual coupling between the two windings.

In addition, a decoupling network 19 is connected at the output of input tank circuit 11, which is composed of capacitor 20, acting as an RF return to ground, choke coil 21 and capacitor 22. This network acts to attenuate the flow of IF signal to the AGC circuit and will allow the desired IF generated by the input tank circuit 11 to pass through to input grid 25 of pentode 29. Pentode 29, in the example shown, has a filament 23, a cathode 24, a first or signal input grid 25, a screen grid 26, a second control or suppressor grid 27 which is coupled to cathode 24, and a plate 28. Pentode 29 is inserted in a ceramic socket 30. The elements of pentode 29 are connected to terminal posts 1 through 7 located at the lower portion of the ceramic socket 30. Plate 28 is connected to terminal post 5. The input and screen grids 25 and 26 are connected to terminal posts 1 and 6, respectively. The suppressor grid 27 is tied into cathode 24 which is connected to terminal posts 2 and 7.

The intermediate frequency signal potential derived from input tank circuit 11 is impressed upon input grid 25 via terminal post 1. The output of pentode 29 is passed via plate 28 to terminal post 5, where it serves to excite an output tank circuit 31 comprising a primary winding 32 of transformer 34 and a condenser 33 in parallel. Output tank circuit 31 is resonating at the assigned intermediate frequency, and is also connected between the terminal posts 5 and 6. Primary winding 32 of transformer 34 is inductively coupled to secondary winding **9*a* in the input tank circuit 11*a* of adjacent electrical device 13*b*, which is similar to the input tank circuit 11 of electrical device 13. Connected to output tank circuit 31 of electrical device 13 is decoupling network 37, which is composed of condenser 38 acting as an RF return to ground, choke coil 39 and condenser 40. This decoupling network 37 performs the same function as the aforementioned decoupling network 19 which, in this instance, prevents the flow of IF signal to the B+, and allows the generated intermediate frequency to pass through output tank circuit 31 to input tank circuit 11*a* found in adjacent electrical device 13*b***.

Filament 23 is connected to the terminal posts 3 and 4. Connected to terminal post 4 is found another decoupling network 41 which is composed of choke coil 42 and capacitor 43. This decoupling network acts to prevent the flow of IF signal to the filament supply circuits. Between terminal posts 4 and 7 is connected a shield 44 extending crosswise of the casing. This shield 44 acts to prevent regenerative coupling between the plate and grid connections of the terminal posts 1 through 7 located at the bottom of ceramic socket 30.

Figure 2:
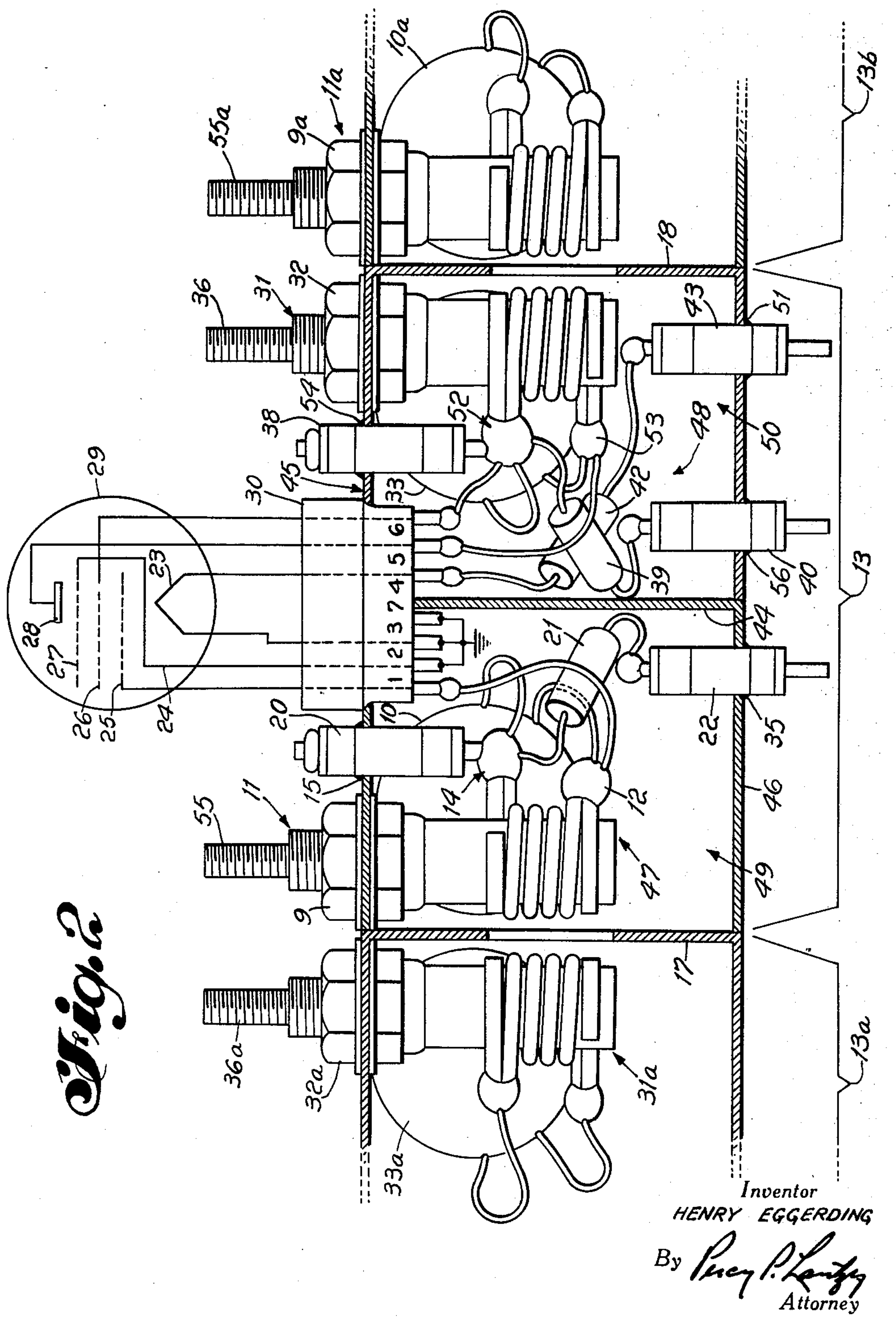
Fig. 2 is a longitudinal sectional view of an assembly of typical electrical devices.
Figure 3:
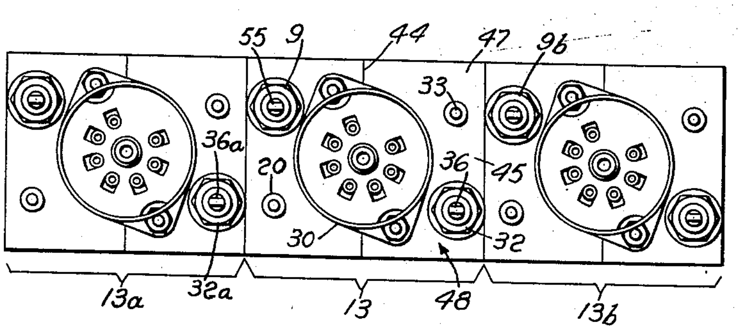
Fig. 3 is a top plan view of Fig. 2.

Referring now to Figs. 2 and 3, there is illustrated an assembly of electrical devices wherein the electrical elements are all encased in a shielded enclosure which is utilized for mounting electronic components. For purposes of illustration the electrical devices 13, 13*a*, and 13*b* are connected in the form of IF amplifiers. Electrical device 13 is composed of a top wall 45, a base wall 46, side walls 47, 48 and end walls 17 and 18. In the center of top wall 45 is connected a ceramic socket 30 having a pentode 29 mounted therein. In the bottom of ceramic socket 30 are connected terminal posts 1 through 7 which are utilized for the purpose of connecting the plate, cathode, and grid electrodes of pentode 29 to the circuit connections of the IF amplifier contained in electrical device 13. The shield 44 is connected between terminal posts 4 and 7 to the walls 45—48. This shield separates electrical device 13 into two sections, a left-hand section 49 and a right-hand section 50.

Connected to top wall 45 of left-hand section 49 is input tank circuit 11, composed of a slug tuned coil 9 having an adjustable control screw 55 to vary its inductance and a fixed tuning capacitor 10 soldered together at junctions 12 and 14. Slug tuned coil 9 is located in the left-hand section 49 of top wall 45 and its primary winding is disposed adjacent to the opening in end wall 17. The size of this opening will determine the extent of the mutual coupling between input tank circuit 11 of electrical device 13 and the output tank circuit 31*a* of adjacent electrical device 13*a*.

The output of fixed tuning capacitor 10 is connected to a decoupling network composed of feed-through capacitor 20 acting as an RF return to ground, choke 21, and feed-through capacitor 22. Feed-through capacitor 20 is mounted on wall 45 of left-hand section 49. Feed-through capacitor 20 is held in wall 45 by a solder joint 15. Connected to the inside terminal of feed-through capacitor 20 is an RF choke 21 which in turn is coupled to feed-through capacitor 22 which is soldered at junction 35 to base plate 46 of left-hand section 49. In addition, the output of fixed tuned capacitor 10 is coupled to the input grid 25 of pentode 29 via terminal post 1 of ceramic socket 30. The output of pentode 29, which is fed via plate 28 to terminal post 5, is coupled to output tank circuit 31 which is located on top plate 45 of right-hand section 50. Output tank circuit 31 is composed of slug tuned coil 32 having an adjustable control screw 36 to vary its inductance and a fixed tuned capacitor 33 which is soldered at junctions 52 and 53. Slug tuned coil 32 is mounted on top plate 45 of right-hand section 50. The windings of slug tuned coil 32 are disposed adjacent to the opening in side wall 18. The size of this opening determines the degree of coupling between the windings of slug tuned coil 32 and the windings of slug tuned coil 9*a* located in the input tank circuit 11*a* of adjacent electrical device 13*b*.

The output of fixed tuned capacitor 33 is connected to a decoupling network composed of feed-through capacitor 38 acting as an RF return to ground, RF choke 39, and feed-through capacitor 40. Feed-through capacitor 38 is mounted and soldered at junction 54 to top plate 45 and is located between ceramic socket 30 and slug tuned coil 32. Connected to the inside terminal of feed-through capacitor 38 is RF choke 39 which is fed to feed-through capacitor 40 which is mounted on wall 46 at solder junction 56 of right-hand section 50. Another decoupling network composed of RF choke 42 and feed-through capacitor 43 is connected between terminal post 4 and wall 46 of right-hand section 50. Feed-through capacitor 43 is mounted and soldered at junction 51 on wall 46. In addition, the shield 44 is connected between terminal posts 4 and 7 and walls 45–48. This shield divides electrical device 13 into left and right-hand sections 49 and 50, respectively. Shield 44 acts to prevent regenerative coupling between the plate and grid connections of the terminal posts 1 through 7 located at the bottom of ceramic socket 30.

In Fig. 3 the top view of the assembly of electrical devices is shown, the tuning screws 55 and 36 for tuning coils 9 and 32 being accessible from the top. In addition, the removal of the electron discharge device 29 from ceramic socket member 30 can easily be had. The removal and replacement of an electrical device, such as device 13, can be readily achieved, requiring only subsequent retuning of slug tuned coil 32*a* of adjacent electrical device 13*a* and slug tuned coil 9*b* of adjacent electrical device 13*b*. Finally, the technique of shielding each electrical device, as previously described and shown in Figs. 1 and 2, and the technique of coupling the input and output circuits of adjacent devices results in a very compact assembly.

While I have described above the principles of my invention in connection with specific apparatus, it is to be clearly understood that this description is made only by way of example and not as a limitation to the scope of my invention as set forth in the objects thereof and in the accompanying claims.

I claim:

1. An electrical device comprising an input circuit, an output circuit, an electron discharge device having at least a cathode, anode and a control electrode, means to shield said input and output circuits comprising a severable first shielding casing having integral side walls, at least one end wall, and at least one open end, a second shielding casing having integral side walls, at least one end wall, and at least one open end, said open end of said second casing being disposed relative to said one end wall of said first shielding casing to enclose one of said circuits, shielding means disposed opposite said open end of said first shielding casing to enclose the other of said circuits, connection means commonly carried by adjacent side walls of said first and second casings to receive terminal connections of said electron discharge device, first circuit connections coupling said one of said circuits to certain of said terminal connections, second circuit connection coupling said other of said circuits to others of said terminals connections, said end wall of said first shielding casing being disposed between said terminal connections of said first circuit connection and said terminal connections of said second circuit connection to shield said input and output circuits one from the other.

2. An electrical device comprising a plurality of electrical networks, each of said electrical networks comprising an input circuit, an output circuit, and an electron discharge device having at least a cathode, anode and a control electrode, severable shielding means to shield each of said circuits, each of said shielding means comprising a severable first shielding casing having integral side walls, at least one end wall, and at least one open end wall, and at least one open end, said open end of said second shielding casing being disposed relative to said one end wall of said first shielding casing to enclose one of said circuits of an associated one of said networks, said end wall of said second shielding casing being disposed relative to an open end of a similar first shielding casing of a first adjacent one of said networks to enclose one of the circuits of said first adjacent one of said networks, and said open end of said first shielding casing being disposed relative to the end wall of a similar second shielding casing of a second adjacent one of said networks to enclose the other of said circuits of said associated one of said networks, connection means commonly carried by adjacent side walls of said first and second casing of each of said severable shielding means to receive terminal connections of said electron discharge device, first circuit connections coupling said one of said circuits of said associated network to certain of said terminal connections, and second circuit connections coupling said other of said circuits of said associated network to others of said terminal connections, said end wall of said first shielding casing of each of said shielding means being disposed between said terminal connections of said first circuit connections and said terminal connections of said second circuit connection to shield said input and output circuits and their respective ones of said circuit connections one from the other.

3. An electrical device adapted to be assembled with other similarly constructed electrical devices as associated parts of an electrical network, each of said devices comprising an input circuit including a secondary winding of a first coupling transformer, an output circuit including a primary winding of a second coupling transformer, an electron discharge device having at least a cathode, an anode, and a control electrode, a severable shielding casing comprising at least a pair of severable first and second cells, each cell of said pair having as an integral part thereof sidewalls, at least one open end, and at least one end wall, said open end of said second cell being disposed relative to said end wall of said first cell being disposed relative to an end wall of an adjacent similar second cell to enclose the other of said circuits, connection means commonly carried by two adjacent sidewalls of said pair of cells to receive the terminal connections of said electron discharge device, first circuit connections coupling said one of said circuits to certain of said terminal connections, second circuit connections coupling said other of said circuits to others of said terminal connections, said end wall of said first cell being disposed between said terminal connections of said first circuit connection and said terminal connections of said second circuit connection to shield said input and output circuits and their respective ones of said circuit connections one from the other, said end wall of said second cell being disposed between the windings of the coupling transformer associated with said one of said circuits enclosed therein and including therein an opening to provide inductive coupling between the windings of the coupling transformers associated with said one of said circuits, and said end wall of said adjacent similar second cell being disposed between the windings of the coupling transformer associated with said other of said circuits enclosed in said first cell and including therein an opening to provide inductive coupling between the windings of the couplings transformers associated with said other of said circuits.

4. An electrical device adapted to be assembled with other similarly constructed devices as associated parts of an electrical network, each of said devices comprising an input circuit including a secondary winding of a first coupling transformer, an output circuit including a primary winding of a second coupling transformer, an electron discharge device including at least a cathode, an anode and a control electrode having terminals associated therewith, a severable shielding casing comprising a first severable shielding cell, a second severable shielding cell, said first and second severable shielding cells each having sidewalls, an end wall and an open end, the open end of said second cell being disposed relative to the end wall of said first cell to enclose said output circuit, the open end of said first cell being disposed relative to the end wall of an adjacent second cell of a similar shielding casing to enclose said input circuit, a socket carried jointly by two adjacent sidewalls of said first and second cells to receive said terminals, first circuit connections connected to said socket to couple said input circuit to certain of said terminals, second circuit connections connected to said socket to couple said output circuit to others of said terminals, said end wall of said first cell being disposed between said terminal connections of said first circuit connections and said terminal connections of said second circuit connections to shield said input and output circuits and their respective ones of said circuit connections from each other, the end wall of said second cell being disposed between the windings of said second coupling transformer and including therein an opening to provide inductive coupling between the windings of said second coupling transformer, said end wall of said adjacent second cell being disposed between the windings of said first coupling transformer and including therein an opening to provide inductive coupling between the windings of said first coupling transformer.

References Cited in the file of this patent

UNITED STATES PATENTS

| | | |
|---|---|---|
| 1,832,640 | Landon | Nov. 17, 1931 |
| 1,836,260 | Lewis | Dec. 15, 1931 |
| 1,838,855 | Loewe | Dec. 29, 1931 |
| 1,875,132 | Peterson | Aug. 30, 1932 |
| 1,940,769 | Potter | Dec. 26, 1933 |
| 2,512,138 | Butt | June 20, 1950 |
| 2,560,320 | Winkler | July 10, 1951 |
| 2,718,623 | Yoder et al. | Sept. 20, 1955 |
| 2,895,020 | Ksiazek | July 14, 1959 |
| 2,896,028 | Mackey | July 21, 1959 |

FOREIGN PATENTS

| | | |
|---|---|---|
| 27,787/30 | Australia | July 12, 1930 |